United States Patent
Bremer et al.

(10) Patent No.: US 6,236,717 B1
(45) Date of Patent: May 22, 2001

(54) SIMULTANEOUS VOICE/DATA ANSWERING MACHINE

(75) Inventors: Gordon Bremer, Clearwater; Richard Kent Smith, Seminole, both of FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/002,637

(22) Filed: Jan. 5, 1998

Related U.S. Application Data

(63) Continuation of application No. 08/792,599, filed on Jan. 31, 1997, now Pat. No. 5,719,922, which is a continuation of application No. 08/264,880, filed on Jun. 24, 1994, now abandoned.

(51) Int. Cl.[7] .................................................. H04M 1/64
(52) U.S. Cl. ...................................... 379/88.22; 379/88.13
(58) Field of Search ............................... 379/67.1, 88.08, 379/88.13, 88.22, 88.25, 88.26, 88.27, 88.28, 90.01, 93.09, 93.11, 93.24, 100.15, 373; 348/14, 15, 16; 370/493, 494; 375/222, 219

(56) References Cited

U.S. PATENT DOCUMENTS

| | | | |
|---|---|---|---|
| 4,512,013 | * | 4/1985 | Nash et al. ............................ 370/69.1 |
| 4,589,107 | * | 5/1986 | Middleton et al. ..................... 370/62 |
| 4,596,021 | * | 6/1986 | Carter et al. ............................... 375/5 |
| 4,659,876 | * | 4/1987 | Sullivan et al. ........................ 379/96 |
| 4,736,407 | * | 4/1988 | Dumas .................................... 379/96 |
| 4,782,482 | * | 11/1988 | Kiatipov et al. ........................ 370/86 |
| 4,809,271 | * | 2/1989 | Kondo et al. .......................... 370/110 |
| 4,813,040 | * | 3/1989 | Futato .................................... 370/111 |
| 4,825,461 | * | 4/1989 | Kurita et al. ............................ 379/93 |
| 4,837,798 | * | 6/1989 | Cohen et al. ............................ 379/88 |
| 4,853,952 | * | 8/1989 | Jachmann et al. ...................... 379/88 |
| 5,138,925 | * | 8/1992 | Koguchi et al. ........................ 84/609 |
| 5,153,578 | * | 10/1992 | Izawa et al. .......................... 340/825 |
| 5,164,982 | * | 11/1992 | Davis ...................................... 379/96 |
| 5,214,650 | * | 5/1993 | Renner et al. ..................... 370/110.1 |
| 5,309,434 | * | 5/1994 | Maekawa ............................... 370/62 |
| 5,333,266 | * | 7/1994 | Boaz et al. ............................ 395/200 |
| 5,349,636 | * | 9/1994 | Irribarren .............................. 379/89 |
| 5,351,276 | * | 9/1994 | Doll, Jr. et al. ........................ 379/67 |
| 5,365,577 | * | 11/1994 | Davis et al. ............................ 379/96 |
| 5,375,068 | * | 12/1994 | Palmer et al. ........................ 364/514 |
| 5,390,236 | * | 2/1995 | Klausner et al. ....................... 379/67 |
| 5,428,608 | * | 6/1995 | Freeman et al. ..................... 370/60.1 |
| 5,448,555 | * | 9/1995 | Bremer et al. ......................... 370/20 |
| 5,452,289 | * | 9/1995 | Sharma et al. ...................... 370/32.1 |
| 5,453,986 | * | 9/1995 | Davis et al. ............................ 370/62 |
| 5,473,675 | * | 12/1995 | Chapman et al. ..................... 379/93 |
| 5,479,411 | * | 12/1995 | Klein ...................................... 379/88 |
| 5,483,580 | * | 1/1996 | Brandman et al. .................... 379/88 |
| 5,502,727 | * | 3/1996 | Catanzaro et al. .................. 370/94.2 |
| 5,537,436 | * | 7/1996 | Bottoms et al. ...................... 375/222 |
| 5,550,649 | * | 8/1996 | Wong et al. .......................... 358/479 |

* cited by examiner

Primary Examiner—Scott L. Weaver
(74) Attorney, Agent, or Firm—Thomas, Kayden, Horstemeyer & Risley, LLP

(57) ABSTRACT

A simultaneous voice and data modem coordinates the storage of voice messages and data messages on an audio answering machine and a personal computer, respectively. This allows the called party to subsequently retrieve, via the simultaneous voice and data modem, both a voice message and an associated data message, i.e., a multimedia message, where the called party listens to the voice message while viewing the data message. The called party can retrieve the multimedia message either locally or from a remote location.

18 Claims, 6 Drawing Sheets

CALLING SIGNAL

| SIGNAL NAME | TONE 1 | TONE 2 | SYMBOL RATE INDICATED |
|---|---|---|---|
| SVD CNG-a | 1550 Hz @ -3 dB | 825 Hz @ -3 dB | 3000 s/s |
| SVD CNG-b | 1550 Hz @ -3 dB | 875 Hz @ -3 dB | 2800 s/s |

ANSWER IDENTIFICATION SIGNAL *

| SIGNAL NAME | TONE 1 | TONE 2 | SYMBOL RATE INDICATED |
|---|---|---|---|
| SVD AID-a | 1000 Hz @ -3 dB | 801 Hz @ -3 dB | 3000 s/s |
| SVD AID-b | 1000 Hz @ -3 dB | 850 Hz @ -3 dB | 2800 s/s |

* FOLLOWED BY STANDARD 2100 Hz ANSWER TONE

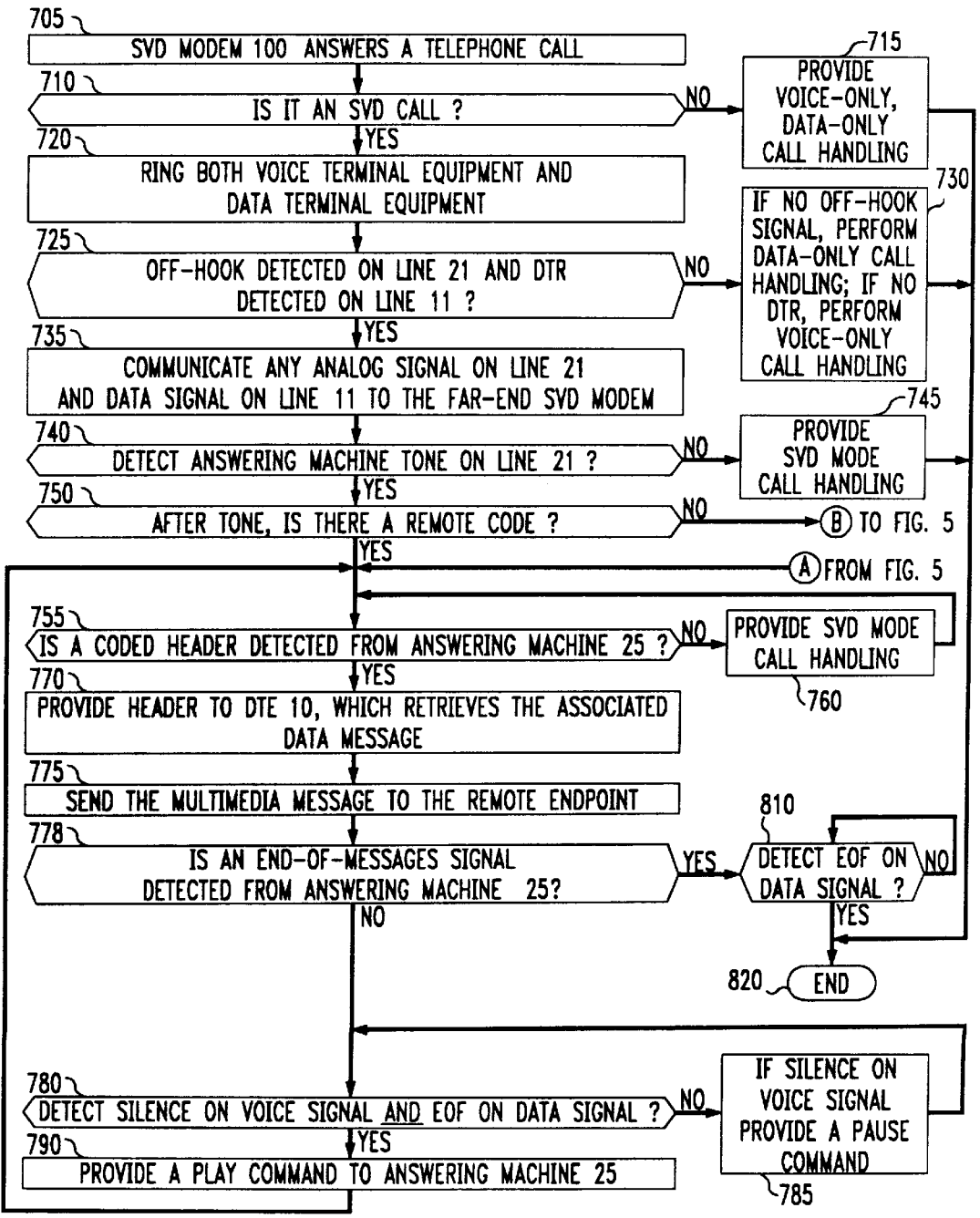

SIMULTANEOUS VOICE/DATA ANSWERING MACHINE

BACKGROUND OF THE INVENTION

This application is a continuation of application Ser. No. 08/792,599, filed Jan. 31, 1997, now U.S. Pat. No. 5,719,922, which is a continuation of application Ser. No. 08/264,880, filed Jun. 24, 1994, now abandoned. The present invention relates to data communications equipment, voice message storage equipment, and data message storage equipment.

Today, the ability exists to receive and store messages representing a variety of different media. As used herein, the term "media" refers to the type of information conveyed in a message. For example, a user can "listen" to a message recorded on a telephone answering machine. This represents an audio form of messaging, i.e., an "audio media." Similarly, a user can "see" a message on the display of a computer, e.g., "electronic mail" (e-mail), which in simple form is simply a data message comprising alpha-numeric characters, i.e., a "video media.". Finally, the co-pending, commonly assigned, U.S. Patent application of Bottoms et al. entitled "Simultaneous Analog and Digital Communication Applications," Ser. No. 08/076505, now U.S. Pat. No. 5,448,555, filed on Jun. 14, 1993, describes a simultaneous voice and data answering machine which stores both digital and analog signals for latter retrieval.

However, in all of these messaging systems, the inherent characteristic is that a person uses them separately—one media at a time. For example, either a person listens to an audio message from their telephone answering machine, or logs into a computer system to retrieve their e-mail. In other words, each media-specific message is typically stored and accessed independently of each other.

SUMMARY OF THE INVENTION

We have realized a method and apparatus that coordinates the separate storage of messages, where each message represents information to be conveyed in a different media. This allows a user to store and retrieve, in effect, a multimedia message. For example, a multimedia message includes an audio message and an associated data message, with the result that while the user is listening to the audio message, the user is also viewing the associated data message.

In an embodiment of the invention, a simultaneous voice and data (SVD) modem coordinates the storage of voice messages and data messages on an audio answering machine and a computer, respectively. This allows the called party to subsequently retrieve, via the SVD modem, both a voice message and an associated data message, i.e., a multimedia message, where the called party listens to the voice message while viewing the associated data message. The called party can retrieve the multimedia message either locally or from a remote location.

BRIEF DESCRIPTION OF THE DRAWING

FIG. 6 shows an illustrative multimedia message header;

FIG. 7 is an illustrative flow diagram of a method embodying the principles of the invention for remotely retrieving a multimedia message;

DETAILED DESCRIPTION

Figures 1, 3:
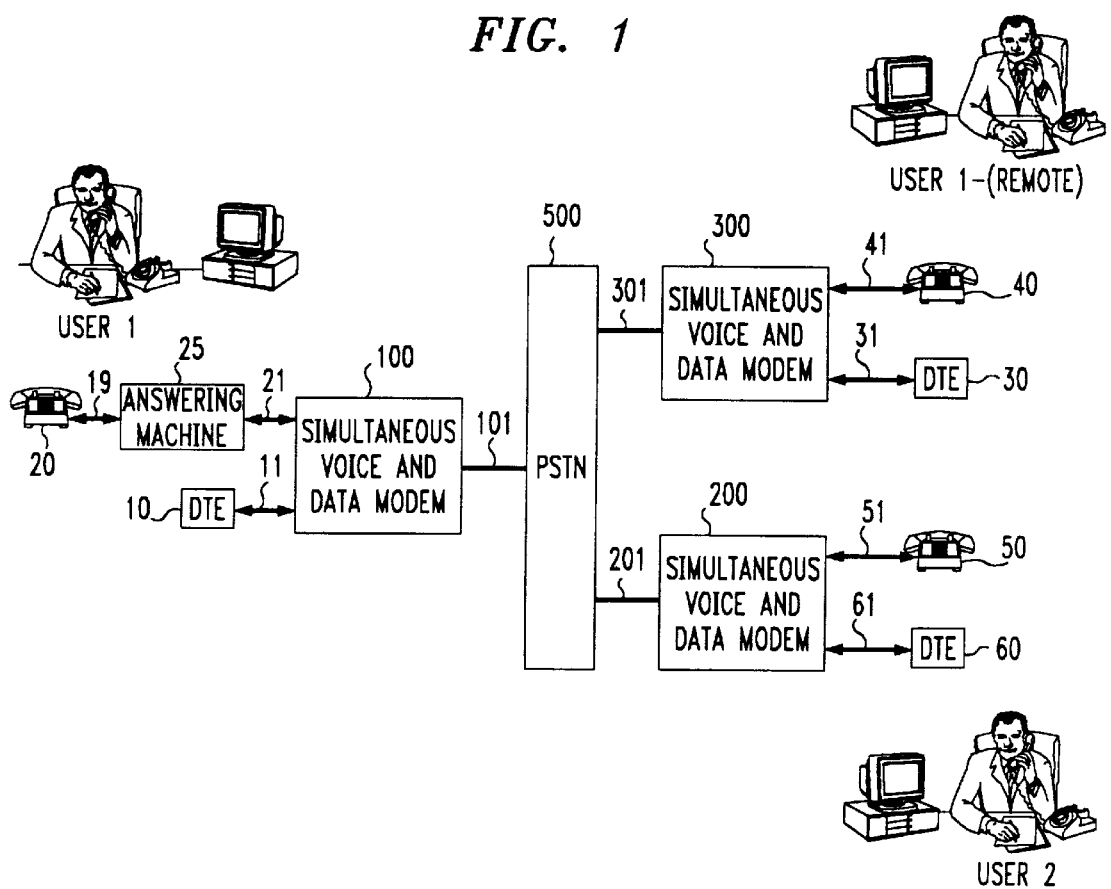
FIG. 1 shows a block diagram of a simultaneous voice and data communications system embodying the principles of the invention.
FIG. 3 is a table showing illustrative SVD identification signal assignments.

A block diagram of a simultaneous voice and data communications system embodying the principles of the invention is shown in FIG. 1. As shown in FIG. 1, there are illustratively three communications endpoints represented by user 1, user 2, and user 1 -(remote). The equipment of user 1 includes data terminal equipment (DTE) 10, telephone 20, answering machine 25, and SVD modem 100. DTE 10 is coupled to SVD modem 100 via line 11. Telephone 20 is coupled via line 19 to answering machine 25, which is coupled to SVD modem 100 via line 21. It is assumed that lines 19 and 21 represent a "tip/ring" type of electrical interface. SVD modem 100 is coupled to public switched telephone network (PSTN) 500, via local loop 101, for originating and answering telephone calls. Local loop 101 is a typical "tip/ring" facility, i.e., a wire-pair, upon which a voice-band signal is transmitted between SVD modem 100 and PSTN 500. The equipment of the remaining users is similar. The equipment of user 2 includes DTE 60 and telephone 50, both of which are coupled to SVD modem 200 via lines 61 and 51, respectively. SVD modem 200 is coupled to PSTN 500 via local loop 201. Finally, the equipment of user 1-(remote) includes DTE 30 and telephone 40, both of which are coupled to SVD modem 300 via lines 31 and 41, respectively. Local loop 301 couples SVD modem 300 to PSTN 500. Although any of the SVD modems illustrated in FIG. 1 could embody the inventive concept, in the description that follows it is assumed that only SVD modem 100 incorporates the principles of the invention.

Figure 2:
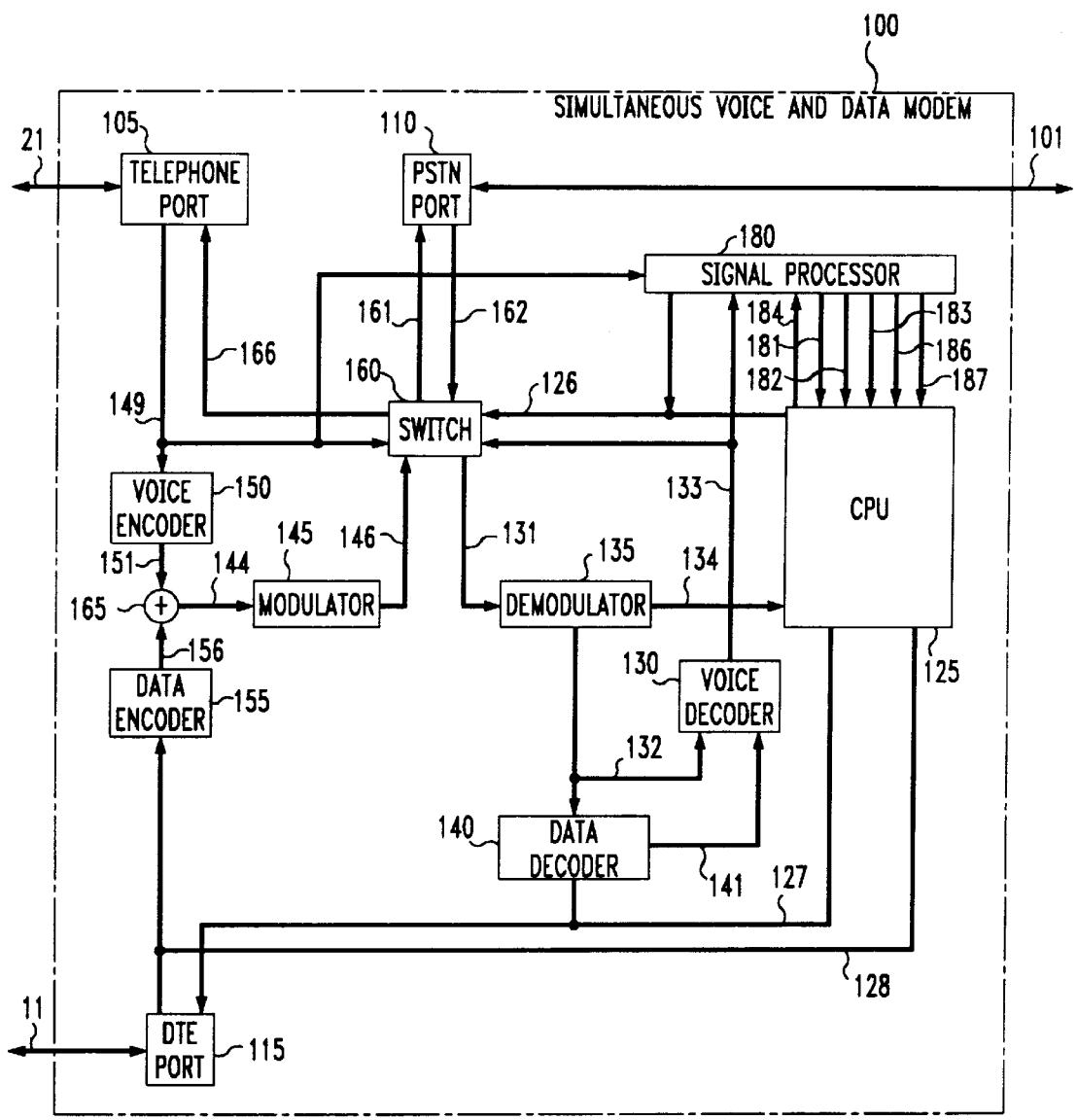
FIG. 2 shows a block diagram of a simultaneous voice and data modem embodying the principles of the invention.

FIG. 2 shows an illustrative block diagram of SVD modem 100. Other than the inventive concept, the individual components of SVD modem 100 are wellknown and are not described in detail. For example, CPU 125 is a microprocessor-based central processing unit, memory, and associated circuitry for controlling SVD modem 100.

Before describing the inventive concept below, a description of the general operation of an SVD modem is provided using SVD modem 100 as an example. The basic operation of an SVD modem, other than the inventive concept, is also described in the commonly assigned, co-pending, U.S. patent application of Bremer et al. entitled "Simultaneous Analog and Digital Communication," Ser. No. 08/076505, filed on Jun. 14, 1993.

SVD modem 100 operates in either a "voice-only" mode, a "data-only" mode, or an SVD mode. The "voice-only" mode simply communicates a signal, e.g., a voice signal, present on one analog port to the other. The "data-only" mode modulates a data signal received via DTE port 115 for transmission via PSTN port 110 to a remote data endpoint, and demodulates a modulated data signal received via PSTN port 110 for transmission to DTE 10. Finally, the SVD mode provides the combination of the "voice-only" and "data-only" mode with the exception that the signal received and transmitted via PSTN port 110 is a combined voice and data signal (hereafter referred to as an "SVD signal").

CPU 125, of SVD modem 100, controls switch 160, via line 126, as a function of the type of the operating mode of SVD modem 100. For example, if SVD modem 100 is in the "voice-only" mode, switch 160 couples any signal on line 162 to line 166 for transmission via telephone port 105, and couples any signal on line 149 to line 161 for transmission via PSTN port 110. The remaining components, e.g., data encoder 155, data decoder 140, voice decoder 130, and voice encoder 150, are disabled by control signals (not shown) from CPU 125. Consequently, in the "voice-only" mode any analog signal appearing at one of the PSTN ports is coupled, or bridged, to the other PSTN port.

If SVD modem 100 is in the "data-only" mode, switch 160 couples any signal on line 146 to line 161 for transmission via PSTN port 110, and couples any signal on line 162 to line 131. In the "data-only" mode, voice encoder 150 and voice decoder 130 are disabled by control signals (not shown) from CPU 125. In this mode of operation, any data signal appearing at DTE port 115 (assuming SVD modem 100 is not receiving "AT commands") is encoded by data encoder 155. DTE port 115 is assumed to represent an Electronic Industry Association (EIA) RS-232 interface. The latter couples not only data from DTE 10 for transmission to an opposite endpoint, but also couples commands from DTE 10 to SVD modem 100 during the well-known "AT command mode" of operation. Data encoder 155 includes any of the well-known encoding techniques like scrambling, trellis-coding, etc., to provide a sequence of symbols on line 156 at a symbol rate, 1 IT to modulator 145. The symbols are selected from a two-dimensional signal space (not shown). Note, since voice encoder 150 is disabled, adder 165 does not add a signal to the output signal from data encoder 155. Modulator 145 illustratively provides a quadrature amplitude modulated signal (QAM) to PSTN port 110 via switch 160. Similarly in the reverse direction, a QAM signal received at PSTN port 110 is provided to demodulator 135 via switch 160. Demodulator 135 provides an encoded data stream to data decoder 140. The latter performs the inverse function of data encoder 155 and provides a received data signal to DTE port 115 for transmission to DTE 10.

Finally, if SVD modem 100 is in the SVD mode, switch 160 couples any signal on line 146 to line 161 for transmission via PSTN port 110, and couples any signal on line 162 to line 131. In the SVD mode, voice encoder 150 and voice decoder 130 are enabled by control signals (not shown) from CPU 125. In this mode, any analog signal, e.g., a voice signal, appearing on line 149 is applied to voice encoder 150. The latter processes the voice signal so that it is mapped into the two-dimensional signal space used by data encoder 155 to provide a voice signal point. This voice signal point defines the magnitude and angle of a "voice signal vector" about the origin of the two-dimensional signal space. Voice encoder 150 provides a sequence of two-dimensional signal points, at the predefined symbol rate of I/T symbols per sec., on line 151. Adder 165 adds each voice signal vector on line 151, if any, to a respective one of the symbols provided by data encoder 155 to provide a stream of signal points to modulator 145. As described above, modulator 145 provides a QAM modulated signal to PSTN port 110 via switch 160. This QAM modulated signal is the above-mentioned SVD signal since it represents both voice and data.

In the reverse direction, the received SVD signal on line 131 is processed as described above by demodulator 135 and data decoder 140 to provide the received data signal on line 127. In addition, voice decoder 130 receives both the received signal Point sequence from demodulator 135 and the decoded symbol sequence from data decoder 140. Voice decoder 130 includes suitable buffering to allow for the decoding time needed by data decoder 140 to make a decision as to a received symbol. Voice decoder 130 subtracts the received symbol provided by data decoder 140 from the respective received signal point provided by demodulator 135 to yield the voice signal vector and then performs the inverse function of voice encoder 150 to provide a received voice signal to telephone port 105, via line 133.

As a result, this SVD technique advantageously provides a voice-band signal that has both an audio portion and a data portion. This allows two users with simultaneous voice and data capable modems to communicate data between them and talk at the same time—yet only requires one "tip/ring" type telephone line at each user's location.

During the establishment of an SVD connection it is advantageous for the calling SVD modem to initially signal the far-end, or called, SVD modem, that the calling modem is also an SVD modem. This initial signaling is accomplished by the use of an SVD identification signal that is transmitted by the calling SVD modem after dialing the telephone number of the called SVD modem. This type of notification allows the answering SVD modem to immediately switch to an SVD mode as opposed to initially defaulting to a standard data modulation like CCITT V.32 and then switching to an SVD mode. An illustrative set of distinctive identification signals for use by an SVD modem is shown in FIG. 2. These handshaking signals include a calling signal, SVD CNG, which include calling tones "a" and "b," and an answer identification signal, SVD AID, which includes answering tones "a" and "b." The called SVD modem provides the answer identification signal as an acknowledgment to the calling SVD modem that the call has been answered by an SVD compatible modem.

The determination of what mode SVD modem 100 is in depends upon whether SVD modem 100 is originating or answering a telephone call. If SVD modem 100 is originating a telephone call, then the calling party, e.g., user 1, can select the particular mode of operation in a number of ways. One illustrative way is simply via a command mode instruction provided via DTE port 115. Another way is for SVD modem 100 to evaluate the state of various signals at both telephone port 105 and DTE port 115. For example, "voice-only" mode is entered if an "off-hook" signal is detected at telephone port 105 and there is no data-terminal-ready (DTR) 5 signal from DTE 10. Conversely, "data-only" mode is entered if there is no "offhook" signal but the DTR signal is active.

When user 1 is the called party, i.e., when SVD modem 100 answers an incoming telephone call, the determination of what operating mode to enter is performed as follows. SVD modem 100 first determines if an SVD identification signal is being transmitted by the calling party's equipment. If SVD modem 100 detects an SVD identification signal, then the SVD mode of operation is entered. However, if no SVD identification signal is detected, SVD modem 100 can either enter the "voice-only" mode or the "data-only" mode. The particular selection is set by user 1 via a command mode instruction provided via DTE port 115. This command mode instruction sets a "default" mode of operation for SVD modem 100 if no SVD identification signal is detected from the calling party's equipment.

Figure 4:
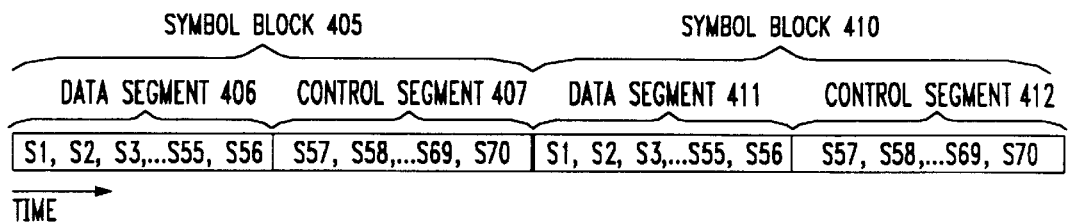
FIG. 4 is an illustrative SVD symbol block that provides a secondary communications channel.

Once an opposite SVD modem has been identified and both modems are communicating in the SVD mode, it is necessary for each SVD modem to communicate control and status information to the opposite endpoint. This is done via a secondary channel that communicates signaling information between, e.g., SVD modem 100 and SVD modem 200, and can be implemented in any number of ways. For example, as is known in the art, a secondary channel can be provided by multiplexing the data modulated signal (here the SVD signal) with another control signal; or a secondary channel can be provided as described in the co-pending, commonly assigned, U.S. patent application of Bremer et al. entitled "Side-Channel Communications in Simultaneous Voice and Data Transmission," serial No. 08/151686, filed on Nov. 15, 1993, now U.S. Pat. No. 5,506,866. FIG. 4 shows a diagram of a transmission scheme that includes a side-channel within an SVD signal. This SVD side-channel not only provides for the transport of additional information between any SVD endpoints—but also allows the voice signal to be transmitted across the full bandwidth of the SVD data connection. As can be observed from FIG. 4, information from an SVD modem is provided in a frame, or "symbol block," e.g., symbol block 405. For the purposes of this example, a symbol block comprises 70 symbols. Consecutive symbols within each symbol block are identified as S1, S2, S3, . . . , S70. Each symbol block is further divided into a data segment, e.g., data segment 406; and a control segment, e.g., control segment 407. Let the group of symbols in the data segment be SI to S56. These are the "data symbols" and always convey DTE data. For the purposes of the following discussion the symbol rate is illustratively 3000 symbols/second (s/sec.), although other symbol rates may be used, e.g., 2800 s/sec. At a symbol rate of 3000 s/sec., the average data symbol rate of a symbol block is equal to (56/70)×3000)=2400 sIsec. Consequently, if there are 6, bits of data per data symbol, the resultant data rate is 14400 bits/sec (bps). It is assumed that this data rate is high enough to meet a user's needs so that the remaining bandwidth of the SVD data connection can be allocated to the control segment, which provides the side-channel.

The remaining symbols of the control segment, i.e., S57 to S70, are the "control symbols." Usually, the latter never convey DTE data, but convey control information. Each control symbol represents a number of "control bits." For example, some of these control bits represent a state identifier, which provides information to the far-end, or receiving, SVD modem as to the mode of operation of the transmitting SVD modem, i.e., whether the transmitting SVD modem is in the "voice-only" mode, "data-only" mode, or SVD mode, of operation. The control symbols are encoded and scrambled the same as the DTE data symbols, e.g., they use the same signal space. The control symbols provide the side-channel for conveying additional signaling information between SVD modem endpoints. Although the data symbols represent user data and the control symbols represent control information, both the data and control symbols may also convey analog data, which in this example is any voice signal that is provided to SVD modem 100 by telephone 20. As a result, the side-channel is a part of the simultaneous voice and data transmission.

Figure 5:
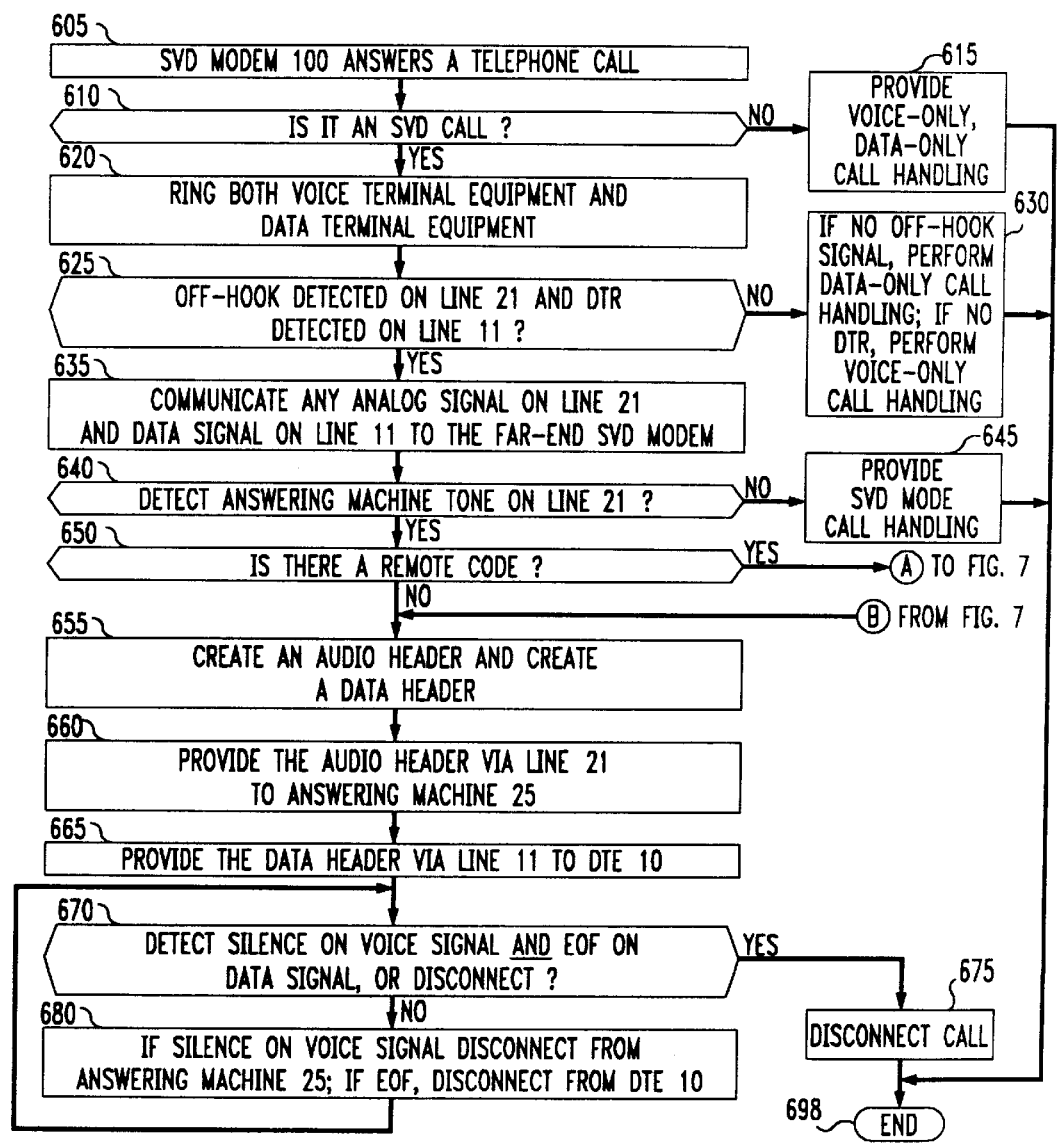
FIG. 5 illustrative flow diagram of a method embodying the principles of the invention for recording a multimedia message.

Having described the general operation of an SVD modem, the inventive concept will now be described. Referring back to FIG. 1, it is assumed that DTE 10 is a personal computer that is powered up and running a software program that enables remote access via line I 1. Examples of this type of remote access software include, "Carbon Copy" from Microcom, Inc., "Close-up" from Norton-Lambert, and "PC Anywhere" from Symantec. This remote access allows any user, e.g., user 2, to run application software on DTE 10 "remotely." In addition, it is assumed that answering machine 25 is any currently available answering machine that supports remote access with well-known features like "pause," etc. Turning now to FIG. 2, it is assumed that SVD modem 100 receives a telephone call from user 2. At this point, in order to facilitate understanding of the inventive concept reference can also be made to FIG. 5, which represents an illustrative method used herein to record a multimedia message.

In step 605, CPU 125 of SVD modem 100 answers a telephone call that user 2 originates. As described above, CPU 125 determines in step 610 whether or not the incoming telephone call is an SVD call by detecting the SVD identification signal, via line 134 from demodulator 135, in step 610. If no SVD identification signal is detected, CPU 125 provides "voice-only," or "data-only," call handling as described earlier. If the incoming call is a voice call, then CPU 125 "rings," or alerts, the voice terminal equipment coupled to line 21 (ringing circuitry, which is well known in the art, is not shown in FIG. 2). In this instance, assuming user I is not present, answering machine 25 subsequently answers the telephone call after the prescribed number of rings and allows the calling party to leave a message. Similarly, if the incoming call is a data call, user 2 remotely accesses DTE 10.

However, if an SVD identification signal is detected, then CPU 125 switches to the SVD mode of operation and, in step 620, "rings," or alerts, any voice terminal equipment and the data terminal equipment coupled to lines 21 and I 1, respectively. If both the voice terminal equipment coupled to line 21 and the data terminal equipment coupled to line 11 answer, then CPU 125 goes to step 635 and provides communication between the voice, and data, terminal equipment of user I and user 2 via an SVD communications channel. But, if either, or both, of the terminal equipment of user 1 do not provide an answer signal to SVD modem 100, then CPU 125 switches to the appropriate mode of operation and provides that level of call handling in step 630, which is similar to step 615. For example, if there is no DTR signal from DTE 10 but an "off-hook" signal is detected on line 21, then CPU 125 signals SVD modem 300, via the above-mentioned SVD side-channel, to switch to the "voice-only" mode of operation.

Once both the voice terminal equipment and the data terminal equipment have answered the incoming telephone calls in step 625, CPU 125 establishes the voice and communications channels in SVD modem to SVD modem 200 in step 635. CPU 125 then monitors line 181, in step 640, for a signal representative of detection of an answering machine tone by signal processor 180. The latter is illustratively a digital signal processor programmed to provide a number of functions like detection of an answering machine tone provided from answering machine 25 on line 149. In actual implementation this function is provided by the same digital signal processor that provides the functionality of data encoder 155, data decoder 140, etc. If an answering machine tone is not detected within a period of time, e.g., 2 seconds, then CPU 125 continues to process the incoming call in SVD mode in step 645.

If an answering machine tone is detected, CPU 125 goes to step 650 to determine whether the calling party is calling to leave a message or canning to retrieve messages. To accomplish this, digital signal processor 180 monitors the output signal of voice decoder 130. After the tone from answering machine 25 ends, digital signal processor 180 detects either the start of a voice signal, i.e., voice energy, or the transmission of a dual tone multi-frequency (DTMF)

code, or password, from the calling party that allows for retrieval of messages from answering machine 25. This predefined retrieval code is stored within SVD modem 100 as a user-defined option. As known in the art, this retrieval code is typically a sequence of touch-tones, e.g., the touch-tones associated with "#177." If digital signal processor 180 detects this retrieval code, a signal is provided to CPU 125 via line 182. In response to receiving this signal, CPU 125 goes to step 755 of FIG. 7. The latter is an illustrative flow chart for retrieving a multimedia message and is described below.

However, when voice signal energy is detected by digital signal processor 180, it alerts CPU 125 via line 183. CPU 125 then creates in step 655 a multimedia message field, or paired fields, that comprises information which couples the audio message end the data message for latter retrieval by the called party. As used herein, each field is illustratively referred to as a "header," with a pair being referred to as a "paired-header." An example of a multimedia message header is shown in FIG. 6. Multimedia message header 950 includes audio header 955 and data header 960. Although audio header 955 and data header 960 do not have to be identical, for the purposes of this example, they are the same. Each header includes a "preamble," a "body," and an "end-of-header." The preamble identifies the beginning of a multimedia message header. The body portion associates a multimedia message number with the subsequent message. And the end-of-header portion signals the end of the multimedia message header. In this example, each header includes seven alpha-numeric characters allocated as shown in FIG. 6. Since audio header 955 and data header 960 include the same information, the alphanumeric characters that make up these headers are selected from the set of characters commonly associated with the keypad of a telephone set. For example, preamble 956 comprises two characters—"#1"; body 957 includes 4 numbers "0004"; and end-of-header 958 includes one character—#. In this example, the preamble "#1" is always the same to uniquely identify the existence of a multimedia message header. Similarly, the character "#" is always used to identify the end-of-header. The sequence of four numbers in the body portion of a header is illustratively an incrementing pattern provided by CPU 125. For example, the first message is given the number "0001," the next message is given the number "0002," etc. This sequence of numbers can be reset to zero by CPU 125 by a suitably defined command mode instruction issued by, e.g., user 1. It should be noted that other schemes can also be developed like using two numbers that reflect the current day of the month and two numbers that identify a particular message received on that day. Although this requires SVD modem 100 to track the current month and day, this allows a user one month to access and remove a multimedia message.

After creating multimedia message header 950 in step 655, CPU 125 controls digital signal processor 180 to provide audio header 955 to answering machine 25, via line 184, in step 660. Digital signal processor 180 provides the audio header 955 as a sequence of DTMF signals, each of which is associated, as known in the art, with a respective one of the alpha-numeric characters in audio header 955. This audio header is not heard by user 2 because digital signal processor 180 provides the audio header to answering machine 25 via line 126. Similarly, in step 665, CPU 125 provides the sequence of ASCII characters that are associated with a respective one of the alpha-numeric characters of data header 960 to DTE 10, via line I 1. In providing the data header to DTE 10, the following illustrative format is used: <command to DTE><data header><optional data message>. The expression <command to DTE>represents one of a set of predefined commands recognizable by the above-mentioned software program executing on DTE 10. It is assumed that the software executing on DTE 10 is suitably modified to recognize these commands. In this context, the following predefined command is provided by SVD modem 100: <store><data header 960>. The <store>command alerts the software executing on DTE 10 to a) store the following data header in non-volatile memory of DTE 10, b) store the subsequently received data message in non-volatile memory of DTE 10, and c) associate the received data header with the subsequently received data message.

Once each respective portion of the multimedia header is provided to the analog and digital answering devices, CPU 125 continues to monitor the recovered voice signal on line 133, via digital signal processor 180, and the recovered data signal on line 127. In steps 670 and 680, CPU 125 separately disconnects from either answering machine 25 if silence is detected in the recovered voice signal, or disconnects from DTE 10 if an "end-of-file" (EOF) character is detected in the recovered data signal. CPU 125 can disconnect from DTE 10 by disabling the dataset-ready (DSR) signal, and can disconnect from answering machine 25 by removing power from line 21. Silence is detected if there is no voice energy for a predefined period of time. The EOF character is a predefined data pattern signaling the end of a data transmission. The EOF character is illustratively used herein to indicate the end of any data transmission although a predefined time-out could also be used in place of an EOF character once CPU 125 detects the data channel is idle. CPU 125 ends the call in step 675 upon either detecting a disconnect from local loop 101, or if silence and an EOF character have both been detected, either sequentially or concurrently.

As a result of the above, user 2 is able to leave user 1 a multimedia message comprising a data message and an audio message. For example, user 2 could leave al audio message like "I'm sending you the text of the letter, note that . . . on line 22 that . . . Give me a call if there are problems." At the same time that user 2 is talking, user 2 presses a key on DTE 60, which transmits a formatted output file to DTE 10, i.e., the opposite endpoint. The formatted output file is terminated with an EOF character. As such, each component message of the multimedia message "complements" each other, they are not simply a "conversion" of one message into a different media.

Retrieval of a multimedia message can be performed either locally or remotely by user 1. FIG. 7 illustrates a flow diagram that allows user 1 to remotely retrieve a multimedia message. In this instance "user 1-(remote)" of FIG. 1, represents user I at a remote location. Steps 705 to 750 of FIG. 7 are identical to steps 606 to 650 of FIG. 6 and are repeated in FIG. 7 for completeness only. As such, except for step 750, the written description of these steps will not be repeated. Beginning then with step 750, CPU 125 monitors the received voice signal, via digital signal processor 180, to determine if a predefined remote access code is detected. If no remote access code is detected, e.g., upon the expiration of a timeout, CPU 125 goes to step 655 of FIG. 5 as described above and records a multimedia message. However, upon detection of a remote access code, CPU 125 monitors, in step 755, the audio signal received on line 21, via line 186 from digital signal processor 180, for the preamble of an audio header. If CPU 125 does not detect an audio header, e.g., after a predefined time-out or upon detection of voice energy via line 187 from digital signal processor 180, CPU 125 provides "normal" SVD call handling in step 760. For example, the current message being played by answering machine 25 may be an audio message that is not associated with any data message stored on DTE 10. This audio message is provided directly to user I(remote) for his, or her, listening pleasure. Similarly, user 1-(remote) can independently access any application program currently being executed on DTE 10.

On the other hand, if digital signal processor 180 detects an audio header, digital signal processor 180 provides an alpha-numeric representation of the audio header to CPU 125 via line 186. CPU 125 provides the audio header, which identifies the data message associated with the stored voice message, to DTE 10 in step 770. In this instance, CPU 125 provides the following illustrative command to DTE 10: <remote retrieval><audio header>. The specific identification of a "remote retrieval" command, informs the software executing on DTE 10 to provide the associated data message to SVD modem 100 for transmission to the far-end SVD endpoint. At this point, SVD modem 100 simply modulates the received analog signal from answering machine 25 and the received data signal from DTE 10 into an SVD signal for transmission to SVD modem 300 in step 775. SVD modem 300 provides the corresponding received analog signal to telephone 40 and the received data signal to DTE 30. As a result, user I-(remote) is able to receive a multimedia message in accordance with the principles of the invention. That is, user 1-(remote) is able to both listen to a voice message while viewing the data message.

While the multimedia message is transmitting to SVD modem 300, CPU 125 monitors both the data signal from DTE 10 and the analog signal from answering machine 25, via digital signal processor 180, to detect the end of the multimedia message transmission. Specifically, in step 778, CPU 180 monitors, via digital signal processor 180, for an end-of-messages signal from answering machine 25. Typically, this is a brief sequence of tones of short duration. Alternatively, a predefined time-out can be used by SVD modem 100 to determine that there are no more audio messages to play-back. If an end-of-messages signal is detected, CPU 125 then monitors for an EOF character in step 810. Upon detection of the EOF character, CPU 125 terminates the call. If an end-of-messages signal is not detected, then, in step 780, CPU 125 determines if silence is detected in the voice signal on line 21 and if an EOF character is detected from DTE 10. If both of these conditions are not true, then CPU 125 goes to step 785. In the latter step, CPU 125 provides a predefined "pause" command to answering machine 25 only if silence is detected in step 780. The pause command stops answering machine 25 from transmitting any additional audio messages before the ending of the data message from DTE 10. This allows both the data and voice messages to be of different (temporal) lengths. It is assumed, although it is not required, that answering machine 25 is a serial device, i.e., it plays-back any stored messages in sequence. However, DTE 10 is effectively a random-access device and only provides the data message requested by SVD modem 100. CPU 125 continues to monitor for the detection of both silence and the EOF character in step 780. Upon detecting the occurrence of both of these conditions, CPU 125 provides a play command to answering machine 25 in step 790. After this step, CPU 125 returns to step 755 to determine if the next message is a multimedia message.

It should be noted that in the case of a large data message, it may be preferable to send the data message first and delay sending the audio portion until transmission of the data message has been completed. If this is the case, step 775 is modified so that SVD modem 100 provides a "pause command" to answering machine 25 until the EOF character is detected in the data message. In this case, the components of the multimedia message are not sent concurrently, but sequentially.

Figure 8:
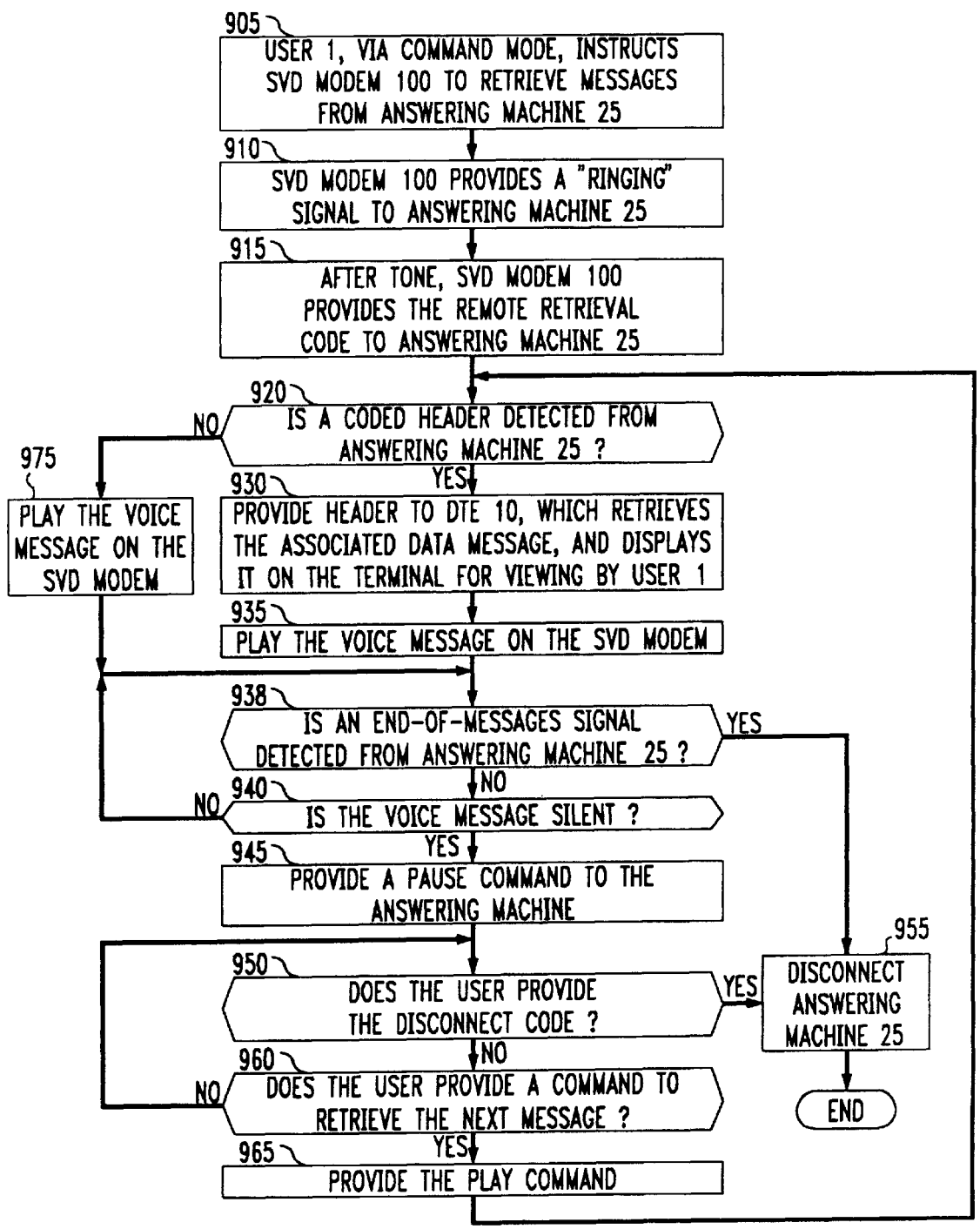
FIG. 8 is an illustrative flow diagram of a method embodying the principles of the invention for locally retrieving a multimedia message.

As described above, user 1-(remote) is able to remotely retrieve any multimedia messages. Turning now to FIG. 8, an illustrative method for locally retrieving a multimedia message is shown. In this example, user I retrieves any messages via DTE 10. It is assumed that user I is in close physical proximity to SVD modem 100 because the speaker of SVD modem 100 (not shown) is used to provide the audio signal to user 1 while user 1 is viewing the data message on a display of DTE 10. Alternatively, user 1 can also use answering machine 25 as the audio source. At this point, user 1 also has the option of reading any e-mail that is stored on DTE 10 independent of any audio messages stored on answering machine 25. However, it is assumed that user 1 desires to not only read any e-mail but also to listen to any associated audio messages at the same time.

To that end, in step 905 user 1, via DTE 10, provides a predefined command mode instruction to SVD modem 100 to retrieve audio messages from answering machine 25. It should be noted that the well-known "AT-command" mode, other than the command mode instructions herein defined as part of the inventive concept, allows a user to send control information to, and receive control or status information from, a modem. After receiving a predefined command to retrieve messages from answering machine 25, CPU 125 provides a ringing signal to answering machine 25 in step 910. In step 915, CPU 125 sends the predefined remote retrieval code, via digital signal processor 180, to answering machine 25 after the answer machine tone has ended. CPU 125 then monitors for a multimedia message header in step 920. If a audio header is not detected, then CPU 125 simply plays the voice message on the speaker (not shown) of SVD modem 100 in step 975. CPU 125 then monitors for an end-of-messages signal in step 938 (described below).

However, if an audio header is detected, then CPU 125 provides the audio header to DTE 10 in step 930, which displays the corresponding e-mail message on the monitor of DTE 10. In this instance, CPU 125 provides the following illustrative command to DTE 10: <local retrieval><audio header>. The specific identification of a "local retrieval" command, informs the software executing on DTE 10 to provide the associated data message to the display of DTE 10 for local viewing by user 1. In addition, CPU 125 provides the audio message sans audio header to the speaker (not shown) of SVD modem 100 in step 935. At this point, CPU 125 monitors for the end-of-messages signal of the audio message in step 938. If the end-of-messages signal is detected, CPU 125 disconnects from answering machine 25 in step 955. If no end-of-messages signal is detected, CPU 125 monitors for silence in the audio message, via digital signal processor 180. Once silence is detected, SVD modem 100 provides a pause command to answering machine 25 in step 945. SVD modem 100 then awaits another command mode instruction from user I in step 950. If a disconnect command is detected, SVD modem disconnects from answering machine 25 in step 955. If user 1 provides another retrieval command, SVD modem 100 provides a play command to answering machine 25 in step 965.

From the above description, it can be observed that multimedia message storage and retrieval can be accomplished with unmodified audio answering machines and, except for the software executing thereon, unmodified data terminal equipment. In addition, it should be noted that although the audio storage and the data storage was provided by separate devices, that these devices, along with SVD modem functionality, can be integrated into a single product.

Figure 9:
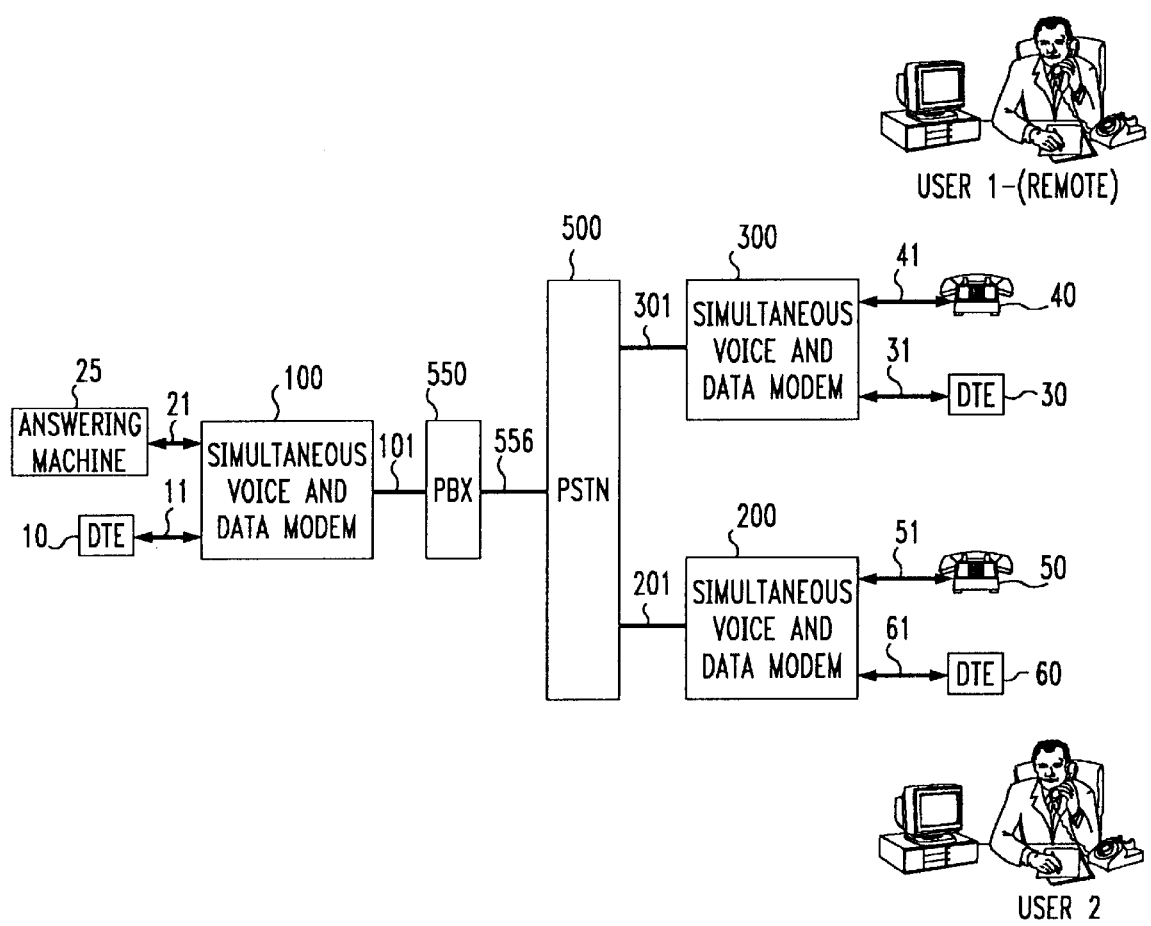
FIG. 9 shows another block diagram of a simultaneous voice and data communications system embodying the principles of the invention.

Referring now to FIG. 9, another illustrative simultaneous voice and data communications system is shown that embodies the principles of the invention. FIG. 9 is similar to FIG. 1 except for the addition of PBX 550, which couples SVD modem 100 to PSTN 500. SVD modem 100 functions in a similar fashion as described above, except that SVD modem 100 now allows multiple parties to both store and retrieve multimedia messages. These parties can be located either behind PBX 550 or within PSTN 500. In this context, answering machine 25 is now assumed to be an addressable form of audio storage. This capability allows a user to only retrieve their audio messages and does not allow a user, absent the correct password, to retrieve someone else's audio messages. As known in the art, PBX 550 provides voice-mail call coverage for its users by directing any calls that are not answered within a prescribed number of rings to a PBX port specifically associated with providing call coverage. In this example, the call coverage port is coupled to SVD modem 100. Since there are now multiple users, the multimedia message header is expanded to include an identifier for the called party. One illustrative way to provide an identifier of the called party to SVD modem 100 is for PBX 550 to provide an "out-of-band" signal to SVD modem 100 immediately after SVD modem 100 answers the ringing signal provided by PBX 550 but before PBX 550 "cuts-through" the incoming telephone call. This "out-of-band" signal is simply a DTMF representation of the extension number of the called party. This extension number is then used by both answering machine 25 and included within the multimedia message header to uniquely identify the subsequent audio and data messages with the called party. An example of a PBX that provides such an "out-of-band" capability is the AT&T System 25.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., encoders, decoders, transmitter, etc., the functions of any one or more of those building blocks can be carried out using one or more appropriate programmed processors, e.g., a digital signal processor.

In addition, although the inventive concept was described in the context of an SVD signal, it should be realized that other forms of simultaneous voice and data transmission could be used, e.g., simple time-division multiplexing of a digitized voice signal and a data signal. In this case, it should be realized that both the voice message and the data message may also be stored together on the associated data terminal equipment. Also, the above-mentioned SVD side-channel can also provide additional features. For example, a remote user could first scan their voice-mail stored on an answering machine and then subsequently send a data retrieval message to the called SVD modem; or, the SVD side-channel can be used to communicate the type of call, e.g., remote retrieval or leaving a message. Finally, other refinements are possible, e.g., if a data message comprises many screens (slides, for example) one could record separate segments of audio—one per slide. Slide change commands could then be entered via the data terminal equipment to send start commands to the local or remote modem, which coordinates the retrieval of the next slide.

What is claimed is:

1. A method for receiving simultaneous voice and data messages in an answering machine comprising the steps of:

receiving a message that represents voice and data information;

decoding a first message that represents voice information in said message;

decoding a second message that represents data information in said message; and coordinating a separate storage of the first message and the second message.

2. The method of claim 1 wherein the step of coordinating includes the steps of:

creating a pair of fields, each field including a message identification number, where one field is associated with the first message and the remaining field is associated with the second message; and storing each field and the respective message on separate storage devices.

3. The method of claim 2 wherein the step of storing further includes the steps of:

storing the field associated with the first message on a first storage device and then storing the first message on the first storage device; and storing the field associated with the second message on a second storage device and then storing the second message on the second storage device.

4. The method of claim 3 wherein the first storage device provides an audio answering machine function and the second storage device is a data terminal equipment.

5. A method for capturing associated voice and data messages, the method comprising the steps of:

answering an incoming call by a modem;

detecting that said incoming call is comprised of voice and data messages that are transmitted simultaneously;

providing a pair of fields, one each to an audio answering device and a data terminal equipment for storage therein;

providing an audio signal to the audio answering device, said audio signal represents a voice message generated by a calling party; and providing a data signal to the data terminal equipment, said data signal represents data generated by the calling party.

6. A method for providing associated audio and data messages transmitted simultaneously to a user, the method comprising the steps of:

instructing an answering machine to retrieve a message;

detecting a field associated with an audio message of the message;

retrieving a message identifier from the field;

retrieving a data message stored in a data terminal equipment as a function of the message identifier; and communicating both the data message and the audio message to a user.

7. The method of claim 6 wherein the audio field is a part of the audio message.

8. The method of claim 6 wherein the step of communicating further includes the steps of:

presenting the audio message to the user aurally; and presenting the data message to the user visually.

9. The method of claim 6 wherein the step of communicating includes the step of transmitting the data message and the audio message over a communications channel to a remote user for presentation to the remote user as a multimedia message.

10. The method of claim 9 wherein the communications channel is a simultaneous voice and data channel.

11. The method of claim 6 wherein the step of communicating includes the steps of:

providing the audio message to the user aurally; and providing a command to the data terminal equipment of the user to display the data message retrieved therefrom on a display of the data terminal equipment.

12. Apparatus for controlling a voice and data answering machine, the apparatus comprising:

first port for coupling to a data terminal;

second port for coupling to an audio answering machine;

third port for coupling to a communications channel for receiving an audio message and a data message transmitted simultaneously; and means for coordinating storage of the received audio message on the audio answering machine and the received data message on the data terminal.

13. The apparatus of claim 12 wherein the means for coordinating creates a pair of fields, one field associated with the received audio message for storage on the audio answering machine and the remaining field associated with the received data message for storage on the data terminal.

14. The apparatus of claim 13 wherein each field includes an identical message identification number.

15. Apparatus for controlling voice and data answering machines, the apparatus comprising:

means for receiving a voice signal and a data signal from a communications channel;

means for providing a) a field, and b) the voice signal to a first answering device; and means for providing a) the field, and b) the data signal to a second answering device.

16. A multimedia messaging system comprising:

an audio answering device for storing an audio message;

a data terminal equipment for storing a data message; and a modem apparatus, coupled to the audio answering device and data terminal equipment, that receives simultaneously transmitted voice and data messages, coordinates the storage of said audio message and said data message, and coordinates the retrieval of both the audio message and the data message for presentation to a user.

17. The apparatus of claim 16 wherein the modem apparatus includes means for communicating the audio message and the data message to the user at a remote endpoint.

18. The apparatus of claim 16 wherein the modem apparatus further includes:

means for coupling to the audio answering device;

means for a receiving a message field from the audio answering device, the message field including a message identifier associated with the audio message; and means for providing a command to the data terminal equipment to retrieve the data message, where the command includes the message identifier.

* * * * *